United States Patent [19]

Naruse et al.

[11] Patent Number: 4,754,116
[45] Date of Patent: Jun. 28, 1988

[54] PROJECTION WELDER

[75] Inventors: Kazuo Naruse, Okazaki; Hideaki Tobita, Toyota; Nobuzi Koda, Kasugai; Taizo Yamaura, Obu; Hitosi Asai, Nagoya, all of Japan

[73] Assignees: Toyota Jidosha Kabushiki, Toyota; Yajima Kogyo, Inc., Nagoya, both of Japan

[21] Appl. No.: 23,400

[22] Filed: Mar. 9, 1987

[30] Foreign Application Priority Data

Jun. 5, 1986 [JP] Japan .................................. 61-130597

[51] Int. Cl.⁴ .............................................. B23K 11/00
[52] U.S. Cl. ................................ 219/78.01; 219/78.15; 219/79
[58] Field of Search ............... 219/78.01, 78.15, 78.16, 219/86.7, 91.1, 93, 98, 99, 79

[56] References Cited

U.S. PATENT DOCUMENTS

| | | | |
|---|---|---|---|
| 2,623,974 | 12/1952 | Prucha | 219/98 X |
| 2,685,018 | 7/1954 | Mynar | 219/79 |
| 2,731,535 | 1/1956 | Grey | 219/119 |
| 2,905,803 | 9/1959 | Brady | 219/79 |
| 3,309,495 | 3/1967 | Shoup et al. | 219/98 |
| 4,609,805 | 9/1986 | Tobita et al. | 219/78.15 X |

FOREIGN PATENT DOCUMENTS 52-32846 3/1977 Japan .
52-116750 9/1977 Japan .
56-14943 4/1981 Japan .

Primary Examiner—E. A. Goldberg
Assistant Examiner—C. M. Sigda
Attorney, Agent, or Firm—Finnegan, Henderson, Farabow, Garrett and Dunner

[57] ABSTRACT

A projection welder for welding a nut to one side of a work has a movable upper electrode and a stationary lower electrode provided with a removable electrode tip for receiving and holding thereon the nut against which the work is urged by the upper electrode so that the work and the nut are welded together. A tubular nut-centering pin projects upwardly from the upper surface of the electrode tip and is axially aligned with the upper and lower electrodes to receive the nut such that the pin engages with a threaded hole in the nut whereby the nut thus received on the nut-centering pin is centered relative to the upper and lower electrodes. The nut-centering pin has an axial through-hole connected to an air source under pressure so that air can be fed under pressure to portions of the work and nut being welded.

16 Claims, 3 Drawing Sheets

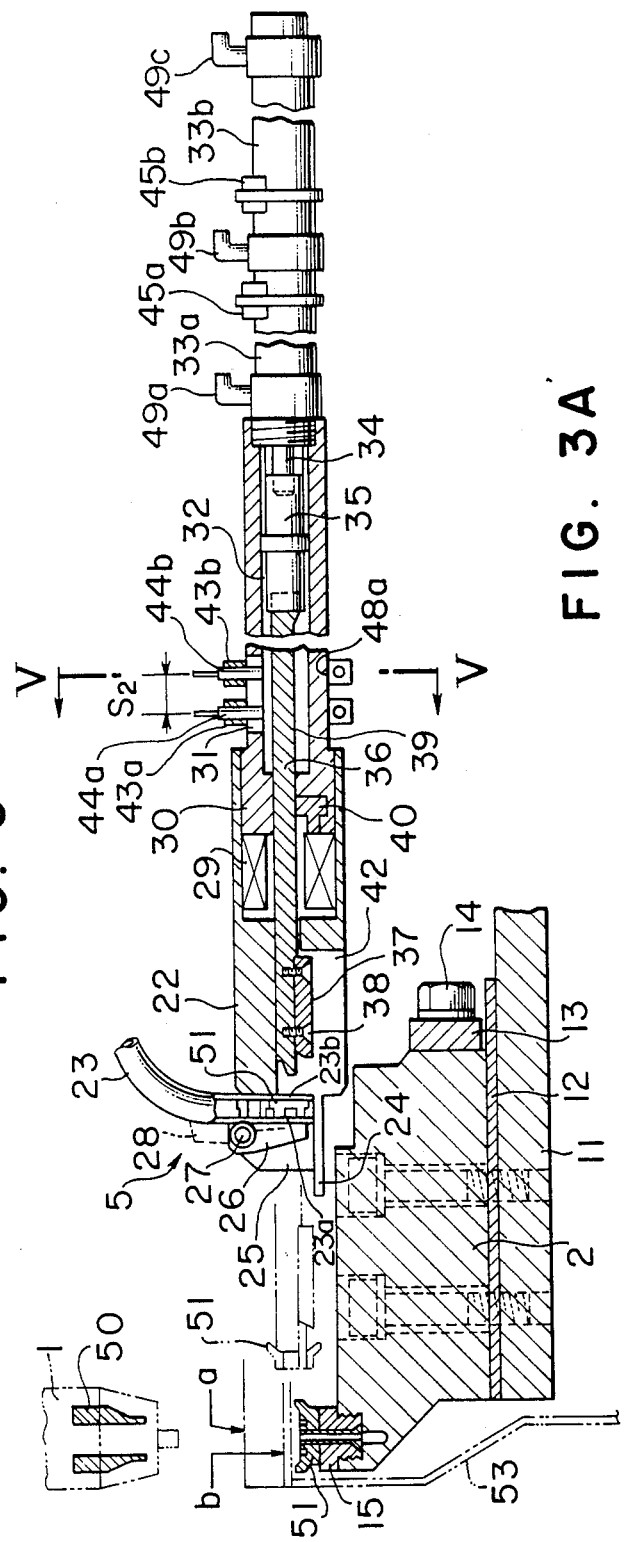
FIG. 3
FIG. 3A

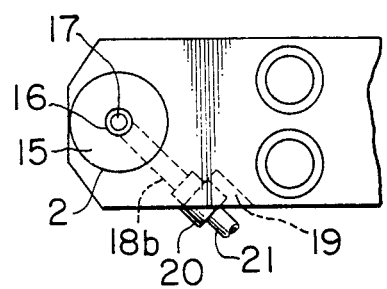
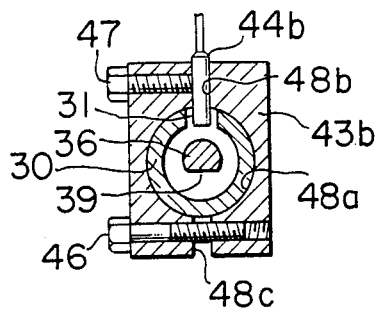
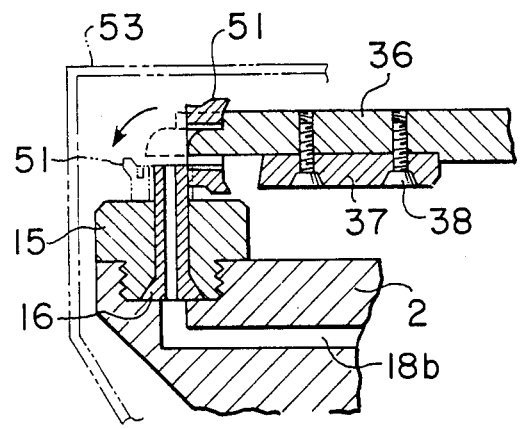
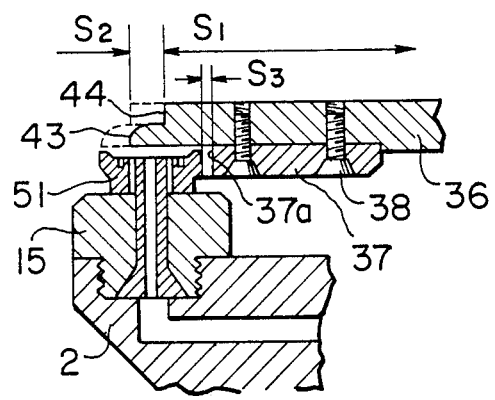

PROJECTION WELDER

BACKGROUND OF THE INVENTION

The present invention relates to a welding apparatus and, more particularly, to a projection welder constructed to facilitate an easy positioning of a weld nut to be welded to a work.

Many kinds of projection welders have been known which are intended to weld nuts to inner surfaces of works having cross-sections of U-shape, H-shape, E-shape, etc. to form projections on the work inner surfaces and which are equipped with nut feeders operative to automatically feed weld nuts to lower electrodes of the welders. Examples of such projection welders are disclosed in Japanese Patent Pre-Examination Publication Nos. 32,846/77 and 116,750/77 and Japanese Utility Model Publication No. 14,943/81.

More particularly, the Publication No. 32,846/77 discloses a projection welder having a lower electrode tip formed therein with a longitudinal groove along which weld nuts are fed one after another by a push rod to a predetermined position. The publication No. 116,750/77 discloses a projection welder of the design described above and which is constructed to direct a jet of air to a nut to be welded to a work. The third publication 14,943/81 discloses a projection welder provided with a nut feeder disposed obliquely relative to a work and having a feeding member adapted to magnetically hold a nut on the forward end thereof and feed the nut to a welding portion of the work.

In all of the prior art projection welders, weld nuts must be fed to lower electrodes with projections of the nuts directed toward mating works so that the projections of the nuts are welded to the inner surfaces of the works. For this purpose, a lower electrode has been known which is provided with a so-called "base type" nut feeder operative to automatically feed weld nuts to the electrode.

The method of projection welding is classified into two kinds as follows:

(a) A projection welding method in which a hole is preliminarily formed in a work at a portion to be welded to a nut so that the hole is utilized to center the nut to the welding portion of the work; and (b) A "no-hole" projection welding method in which no hole is preliminarily formed in a work but the work is first welded to a nut and thereafter a punch disposed in an upper electrode cooperates with the welded nut to punch a hole in the welded work. In the "no-hole" method, the welded nut is utilized as a die which cooperates with the punch disposed in the upper electrode. Thus, nuts must be precisely positioned in alignment with the upper electrode in successive projection welding operations because, if the nuts are out of alignment with the upper electrode and thus with the punch disposed therein, cutting edges of the punch and nuts are unable to accurately punch holes in works with resultant production of inferior goods and occurrence of damage in the electrodes.

In the projection welders for welding nuts to the inner surfaces of works having such a complicated cross-section as referred to above, operators can neither confirm the presence or absence of a nut in position under a work nor watch the position of the nut relative to the work. It is, therefore, required to reliably feed weld nuts successively to a lower electrode of a projection welder and to precisely position the nuts to welding portions of successive works in order that projection welding may be carried out automatically or without control by any operator.

The prior art, however, has following problems:

(a) In the projection welder having the base type lower electrode, weld nuts are successively fed through a feeding groove by a push rod reciprocally movable in the groove. The feeding groove has a width greater than the outer dimension of individual weld nuts so that the nuts can be fed through the groove. In addition, the lower electrode has a nut positioning portion having a dimension greater than the outer dimension of individual weld nuts. As such, the nut-feeding groove and the nut-positioning portion of the lower electrode are determined to facilitate easy feeding and positioning of weld nuts, irrespective of dimensional fluctuation of nuts to be fed. However, the nut-feeding groove and the nut-positioning portion of the lower electrode are obliged to be deformed and widened not only due to wear by sliding engagement with nuts to be fed but also due to heat and pressure generated during repeated projection welding operations.

As such, the positioning of weld nuts in the base type lower electrode depends upon the outer configurations and dimensions of weld nuts rather than on the centers of threaded holes in the nuts which are to be centered relative to the upper electrode. Thus, in the case where the threaded holes in the weld nuts are not coaxial with the outer configurations of the nuts and in the event that the nut-feeding groove and the nut-positioning portion of the lower electrode have widthwise dimensions different from the outer dimensions of weld nuts to be centered to the upper electrode, the nut-feeding groove and/or the nut-positioning portion will fail to correctly center the nuts relative to the upper electrode. This adversely affects the punching in the no-hole projection welding method.

(b) The lower electrodes of the base type are classified into two styles in one of which the lower electrode and the nut-feeding groove member are integral, as disclosed in the above-referenced Japanese Publication Nos. 32,846/77 and 116,750/77 and in the other of which the lower electrode tip, the nut-feeding section and the nut-positioning section are detacheably or removably assembled.

In the first style, all the elements are formed of an electrically insulating material and, if the lower electrode section and the nut-feeding section are worn or deformed, it is difficult to repair only the worn or deformed section. In such an event, therefore, the lower electrode must be replaced as a whole by a new one. It will be appreciated that any electrically insulating materials are relatively soft and tend to be quickly worn. Thus, the lower electrode must be frequently replaced with another, which decreases the economy of welding operation.

In the second style of the lower electrode, worn or deformed parts can easily be replaced by new ones because the lower electrode tip and the nut-feeding and positioning sections are detachably assembled. This, however, greatly complicates the lower electrode structure and increases the length of time required for maintenance. In addition, the nut-positioning section must be made of a material sufficiently hard enough to prevent deformation which would otherwise be caused by the heat produced each time when a work and a nut are welded together. Thus, the second style of lower electrode is expensive.

In addition, the lower electrode is usually associated with a loader for works and various kinds of detection mechanisms for automatic welding operations. Thus, the increase in the size of the lower electrode and the complication of the structure thereof result in a very complicated and bulky welding system as a whole.

(c) Each time when a work is welded to a nut by projection welding, a welding spatter is produced much or less and tends to be adhered to threaded surface of the nut welded to the work, which tends to result in the production of a inferior goods.

In a projection welder operated by the no hole method and provided with a lower electrode of the base type, the weld spatter is directed mainly to the outer surface of a nut welded to a work. However, a part of the spatter is directed not only into a threaded hole in the nut and adhered to the threaded inner peripheral surface of the hole to deteriorate the quality of the threaded hole, but also into an annular groove of U-shaped cross-section which is designed to cooperate with an upper punch to punch a hole in the work welded to the nut with a result that the groove is filled partly or fully with the welding spatter and becomes inoperative to cooperate with the punch.

The problems discussed above are serious in automating welding steps and especially in attaining a highly automated and highly efficient no-hole projection welding method. Thus, there has been a demand for a projection welder in which nuts are fed automatically, precisely and efficiently.

SUMMARY OF THE INVENTION

It is an object of the present invention to provide a projection welder which is improved to eliminate the problems of the prior art discussed above.

It is another object of the present invention to provide a projection welder which is operative with the no-hole method and in which weld nuts can be successively positioned in alignment with the upper and lower electrodes, adhesion of welding spatter can be prevented and the electrode structure is simplified.

It is a further object of the present invention to provide a projection welder of the class referred to in the preceding paragraph and which is equipped with an automatic nut feeder which is suited for a variety of applications and thus provides an economical utility.

The projection welder according to the present invention is for welding a work and a nut together to form a projection on a surface of the work and includes a frame, an upper electrode mounted on the frame for movement relative to the frame in a substantially vertical direction, a stationary lower electrode mounted on the frame in substantially vertically aligned relationship to the upper electrode, a lower electrode tip removably mounted on the lower electrode and disposed in substantially vertically aligned relationship to the upper electrode. The lower electrode tip is formed therein with a substantially vertically extending through-hole substantially coaxial with the upper electrode. A generally tubular nut-centering pin is detachably but substantially snugly disposed in and extends through the through-hole in the lower electrode tip. The nut-centering pin is formed therein with an axial through-hole and has an upper end portion extending upwardly beyond the upper surface of the lower electrode tip to receive thereon the nut to be welded to the work. The upper electrode is initially spaced a distance upwardly from the upper end portion of the nut-centering pin so that the work can be initially positioned between the upper electrode and the nut-centering pin. The upper end portion of the nut-centering pin is so dimensioned as to substantially snugly engage with a through-hole in the nut so that the nut is centered relative to the upper and lower electrodes with an end face of the nut engaged with the upper face of the lower electrode tip and with the other end face of the nut directed towards the work thus positioned. The upper electrode is movable downwardly to bring the work into close contacting relationship to the other end face of the nut so that the work and the nut can be welded together. The lower electrode is formed therein with an air passage having an inner end communicating with the axial through-hole in the nut-centering pin and an outer end adapted to be connected to an air source under pressure so that air under pressure can be fed through the air passage and the axial throughhole to blow welding spatter away from the work and the nut.

The above and other objects, features and the advantage of the invention will be made more apparent by the following description of a preferred embodiment of the invention with reference to the accompanying drawings.

BRIEF DESCRIPTION OF THE DRAWINGS

FIG. 3 is an enlarged partly sectional side view of a lower electrode and a nut feeder of the projection welder shown in FIG. 1;

FIG. 3A is a perspective view of connector interconnecting a nut push rod and a piston rod shown in FIG. 3;

FIG. 4 is a top plan view of the lower electrode;

FIG. 5 is an enlarged sectional view of the nut feeder taken along line V—V in FIG. 3; and FIGS. 6 and 7 are enlarged fragmentary vertical sectional views of the lower electrode and a part of the nut push rod showing the nut push rod in different positions of operation to illustrate how a nut is positioned in place ready for welding.

DESCRIPTION OF A PREFERRED EMBODIMENT

Figure 1:
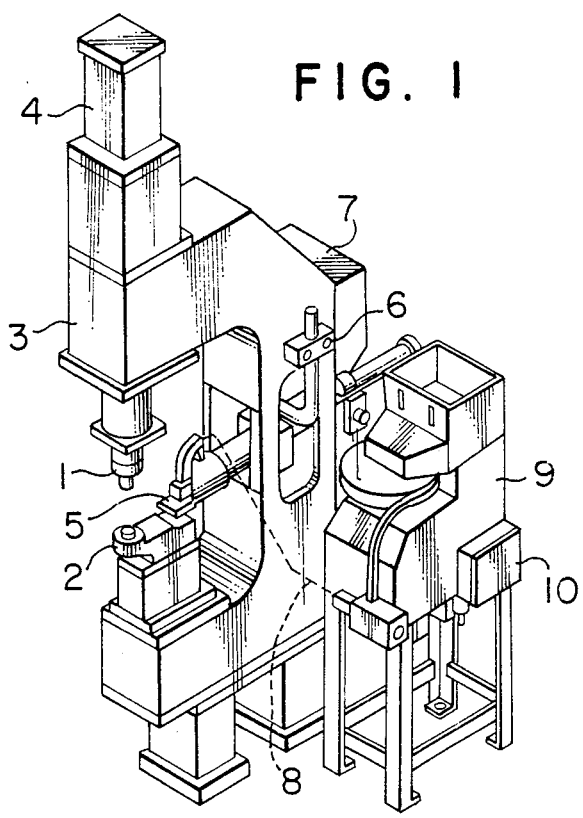
FIG. 1 is a perspective view of a projection welder embodying the present invention.

Referring to FIG. 1, a projection welder embodying the present invention includes an upper electrode 1 mounted on a welder frame 3 for vertical movement by means of a cylinder unit 4. The welder also includes a lower electrode 2 secured to the frame 3 in vertically aligned relationship to the upper electrode 1. A head 5 for feeding nuts to the lower electrode 2 is supported by a bracket 6 from the frame 3 and positioned rearwardly of and in radially aligned relationship to the lower electrode 2 such that the feeder head 5 is at substantially the same level as the top face of the lower electrode 2.

The feeder head 5 is connected through a flexible feeder tube 8 to a parts feeder 9, the operation of which is controlled by means of a parts feeder controller 10. A welder controller 7 is mounted on the side of the welder frame 3 which is rearwardly remote from the upper and lower electrodes 1 and 2.

Figure 2:
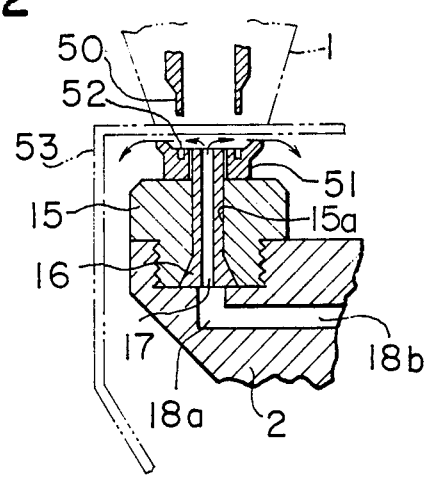
FIG. 2 is an enlarged fragmentary sectional view of a head section of the projection welder shown in FIG. 1.

As best seen in FIG. 2, the upper electrode 1 accommodates a punch 50 operative to punch a hole in a work, as will be described in more detail later. A lower electrode tip 15 is detachably mounted on the upper face of the lower electrode 2 and disposed at a front part thereof in vertically aligned relationship to the upper electrode 1. The tip 15 is formed therein with a vertically extending through-hole 15a through which a tubular nut centering pin 16 extends beyond the upper face of the tip 15. The nut centering pin 16 is formed therein with an axial through-hole 17 pneumatically connected to vertical and horizontal passages 18a and 18b both formed in the lower electrode 2 and communicating with each other. The horizontal passage 18b has an outer end connected to an end of an air hose 21 by a hose coupling 20 disposed in a recess 19 formed in a side of the lower electrode 2, as shown in FIG. 4. The other end of the air hose 21 is connected to a conventional air source (not shown) which is operative to feed air under pressure through the air hose 21 and the vertical and horizontal passages 18a and 18b so that the air is fed through the through-hole 17 in the nut centering pin 16 to the underside of a work 53 to be welded to a nut 51 (see FIG. 2). The pin 16 is a made of an electrically insulating material and has a downwardly diverging frusto-conical lower end received in a complementary recess in the lower end of the electrode tip 15. The upper end of the pin 16 projects from the top face of the tip 15 a distance substantially to a level of the work 53 to properly position the nut 51 in place when the work 53 and the nut 51 are welded together.

Referring to FIG. 3, the lower electrode 2 is fixedly mounted on a holder 11 with a insulator 12 disposed therebetween and has an end electrically connected to an electric supply cable 13 by means of a nut 14, so that the lower electrode is electrically connected to an electrical power source, not shown.

The feeder head 5 includes an elongated head collar 22. A chute 23 has an inner passage of a diameter greater than the outer diameter of each of nuts 51 to be fed to the lower electrode 2 and is connected at the lower end to the head collar 22 at the front end thereof. The lower end exteremity of the chute 23 is closed by a stop plate 24. A pair of diametrically opposed front and rear openings 23a and 23b are formed in the peripheral wall of the lower end portion of the chute 23 and are aligned radially of the axis of the nut centering pin 16. The front opening 23a has a size slightly greater than the size of each nut 51 to be fed, while the rear opening 23b has a size which allows a front end portion of a push rod 36 being moved therethrough, the push rod 36 being reciprocally movable through the head collar 22 to successively push nuts 51 from the lower end portion of the chute 23 towards the lower electrode 2, as will be described in detail later.

A bracket 25 is fixed to the lower end portion of the chute 23 and carries an arm or lever 26 pivotally mounted on a hinge pin 27 fixed to the bracket 25. The lever 26 is resiliently biased by a spring 28 to normally close the front opening 23a.

The feeder head collar 22 has a rear end formed therein with a recess in which an electromagnetic coil 29 and a front end of a sleeve 30 are fixedly received. The sleeve 30 is formed therein with a through-hole 32 extending axially therethrough and with a sensor opening 31 communicating with the through-hole 32 transversely thereof and open in the outer peripheral surface of the sleeve 30. The rear end of the sleeve 30 is connected to a pair of pneumatically operable cylinders 33a and 33b connected in series. The series-connected cylinders have a piston rod 34 having a threaded free end which is screwed into an end of a connector 35. The rear end of the push rod 36 is also screwed into the other end of the connector 35 so that the piston rod 34 is drivingly connected by the connector 35 to the push rod 36. As best seen in FIG. 3A, the connector 35 is provided with an annular projection or flange 41 formed on the outer peripheral surface thereof for the purpose to be made apparent later.

The push rod 36 has an axially extending flat bottom surface 39 extending over the entire length thereof excepting the threaded rear end portion thereof, as shown in FIG. 3. The front end of the push rod 36 is shaped to provide a substantially semispherical nut-turning portion 43 and a vertical shoulder surface 44, as best seen in FIG. 7. The shoulder surface 44 is adapted to magnetically hold a nut 51 on the portion 43, as will be described in more detail later. The push rod 36 is adapted to be reciprocally driven by the series-connected pneumatic cylinders 33a and
33b and carries a nut-position adjusting plate 37 secured by screws 38 to the flat bottom surface of the rod 36 adjacent to the nut-turning portion 43.

A pin 40 has an end slidably engage with the flat bottom surface 39 of the push rod 36 to prevent the same from being rotated about its longitudinal axis. The feeder head collar 22 is formed therein with a downwardly open groove 42 which movably accommodates the plate 37 and is operative to guide the reciprocal movement thereof so that the front end portion of the push rod 36 can be correctly guided into and though the openings 23a and 23b formed in the lower end portion of the chute 23.

Sensors 44a and 44b are mounted on the sleeve 30 by mounting plates 43a and 43b, respectively. The mounting plates 43a and 43b are of identical structure. Thus, only one of them 43b will be described with reference to FIG. 5. The sensor mounting plate 43b has a circular central opening 48a receiving the sleeve 30 therein. A sensor mounting hole 48b is formed in the mounting plate 43b and extends radially from an upper surface thereof to the central opening 48a to receive the sensor 44b such that the inner end portion of the sensor 44b extends into the opening 31 formed in the outer peripheral wall of the sleeve 30. The sensor 44b is fixed in position by a bolt 47 screwed into the mounting plate 43b. The central opening 48a is communicated with or open to the bottom surface of the plate 43b through a slit 48c which splits the lower side of the plate 43b into two parts which are urged toward each other by a tightening bolt 46 so that the plate 43b is fixedly secured onto the outer surface of the sleeve 30.

The sensors 44a and 44b are intended to detect advanced and retired positions of the annular projection 41 on the connector 35. For this purpose, the sensors 44a and 44b have their inner ends slightly radially outwardly spaced from the path of the reciprocal movements of the annular projection 41 so as to accurately detect the positions of the annular projection 41 and so as not to interfer with the reciprocal movements of the push rod 36. More specifically, the sensor 44a is intended to detect the position to which the annular projection 41 is moved when the cylinder 33a is pneumatically actuated, whereas the sensor 44b is intended to detect the position to which the annular projection 41 is moved when the cylinder 33b is pneumatically actuated.

Further sensors 45a and 45b are mounted on the cylinders 33a and 33b. The sensor 45a is intended to detect a rearward stroke end of the series-connected cylinders 33a and 33b, whereas the other sensor 45b detects electrically deenergization of the electromagnetic coil 29. The series-connected cylinders 33a and 33b are provided with air ports 49a, 49b and 49c.

In operation, a work 53 is initially held at a higher level a (shown in FIG. 3) above the lower electrode 2 by means of welding jig, loader or fingers of an industrial robot (not shown). The higher level a of the work 53 is determined to leave a sufficient space under the work to enable a nut 51 to be fed from the chute 23 onto the lower electrode 2.

The parts feeder 9 is so constructed as to arrange nuts in the same positions and feed the nuts one after another by compressed air and through the flexible tube 8 into the chute 23 so that a plurality of nuts 51 are superposed one on another in the chute 23 with projections of the nuts directed rearwardly away from the lower electrode 2. Prior to the commencement of a welding operation, the push rod 36 is held in a retracted position shown by the solid line in FIG. 3, so that the front end of the push rod 36 is spaced a distance rearwardly of the lower end of the chute 23, as shown in FIG. 3.

The controller 10 is manually operated to feed a nut 51 onto the lower electrode 2 so that the upper end of the nut centering pin 16 is received in the threaded hole in the thus fed nut 51, as shown by the solid line in FIG. 3. A level b shown immediately above the top face of the nut 51 thus positioned on the lower electrode 2 is set as a position in which the work 53 is ready to be welded to the nut 51.

An automatic operation of the projection welder will then be described hereunder. A welding starting signal will be inputted into the welder by means of, for example, a start button, not shown. A work loader (not shown) will be operated to lower the work 53 until the work engages with the projections on the nut 51 on the lower electrode 2. Then, pneumatic air lines, not shown, are operated by the welder controller 7 so that the cylinder unit 4 is lowered to cause the upper electrode to forcibly urge the work 53 against the nut 51 on the lower electrode 2. Thereafter, an electric current is supplied from a welding electrical supply source, not shown, for a predetermined time period to conduct a welding of the work 53 and the nut 51.

Thereafter, the cylinder unit 4 is again actuated to move the punch 50 downwardly beyond the bottom end of the upper electrode 1 until the punch 50 cooperates with the thus welded nut 51 to punch a hole in the welded work 53. For this purpose, the face of the nut 51 directed to the work 53 and thus toward the punch 50 is formed therein with an annular die groove 52 (see FIG. 2) which cooperates with the lowered punch 50 to punch the hole in the work 53.

The completion of the welding and punching is detected by a sensor (not shown) which emits a signal to the welder controller 10 which in turn operates to change over the supply of pneumatic pressure to the cylinder unit 4 so that it is now lifted together with the upper electrode 1 and the punch 50 is simultaneously retracted into the upper electrode 1. At this time, a piece of scrap which has been punched out of the work 53 and retained in the punch 50 is removed therefrom by a conventional ejector, not shown.

Then, the work loader will again be actuated to lift the work 53 away from the lower electrode 2 and moved to another station.

During the above-described welding of the nut 51 onto the work 53, air under pressure is fed from an air source, not shown, through the air hose 21, the air passages 18a and 18b in the lower electrode 2 and the through-hole 17 in the nut centering pin 16 so that the air is discharged from the upper end of the nut centering pin 16 into a space defined by the cooperation of the projections on the nut 51 and the mating surface of the work 53. The supply of the air is commenced when the lowering of the upper electrode 1 is started.

The discharged air then flows out of the said space through gaps between the projections on the nut 51. Accordingly, materials such as welding dusts produced during each projection welding operation can be blown out of the said space to advantageously assure that the die groove 52, the upper end of the nut centering pin 16 and the opposed faces of the nut 51 and the work 53 can be cleaned by the air.

In addition, the lower electrode 2 can advantageously be cooled because the air flowing through the through-hole 17 in the nut centering pin 16 removes heat from the pin 16 and thus from the lower electrode 2. The discharge of the air through the through-hole 17 in the nut centering pin 16 is discontinued when the work 53 thus welded is moved away from the lower electrode 2.

A succeeding nut 51 will then be automatically fed onto the lower electrode 2 in a manner to be described hereunder. A plurality of nuts 51 supplied from the parts feeder 9 are superposed in the chute 23 in side-by-side contacting relationship one with another. When the preceding projection welding operation has been completed and the upper electrode 1 has been lifted, a signal for the feeding of the succeeding nut 51 is emitted, so that pneumatic air lines are operated to supply pneumatic pressure into the air port 49c of the series-connected cylinders 33a and 33b while the other air ports 49a and 49b of the cylinders are connected to discharge ports, not shown. Simultaneously, the electromagnetic coil 29 is electrically energized to magnetize the push rod 36 so that the shoulder surface 44 at the front end portion of the push rod 36 is also magnetized. The supply of the penumatic pressure into the port 49c actuates the cylinder 33b so that the piston rod 34, the connector 35 and the push rod 36 are moved forwardly (leftwards as viewed in FIG. 3). Thus, the front end portion of the push rod 36 is moved into the lower part of the chute 23 through the opening 23b. Thus, the nut turning portion 43 at the front end of the push rod 36 is inserted into the threaded hole in the lowermost nut 51 in the chute 23 and the shoulder surface 44 on the push rod 36 is brought into abutment engagement with the lowermost nut 51 whereby the nut is magnetically held on the nut turning portion 43, as shown in FIG. 6.

The leftward movement of the piston rod 34 is continued to cause the push rod 36 to remove the lowermost nut 51 from the chute 23 and carry the thus removed nut leftward to rotate the lever 26 clockwise against the spring 28. It is to be noted that the push rod 36 is now moved through the aligned openings 23a and 23b in the lower end portion of the chute 23 so that the upper face of the push rod 36 is in sliding engagement with the succeeding lowermost nut 51 in the chute 23 to prevent the nut from dropping out of the chute.

When the push rod 36 has been moved to a position in which the front face of the nut 51 on the front end portion of the rod 36 is close to the nut centering pin 16 on the lower electrode 2, as shown by the solid lines in FIG. 6, the sensor 45b is operated to deenergized the electromagnetic coil 29 so that the push rod 36 is demagnetized. However, the nut 51 is held on the front end portion of the push rod 36 due to the inertia produced by the thrust force of the shoulder surface 44. The leftward movement of the push rod 36 is further continued to bring the front face of the lower part of the nut 51 on the rod 36 into engagement with the nut centering pin 16 so that the leftward movement of the nut 51 is now blocked by the pin 16. A further leftward movement of the push rod 36 moves the upper part of the nut 51 so that the nut 51 is rotated counterclockwise over an angle of about 90 degrees about the lower part thereof until the nut 51 is placed on the top face of the electrode tip 15 with the threaded hole in the nut 51 receiving the nut centering pin 16 therein, as shown by broken lines in FIG. 6. It is to be understood that the semi-spherical configuration of the nut turning portion 43 of the rod 36 facilitates the counterclockwise rotation of the nut 51 from the solid line position to the broken line position.

The dimension of the entire stroke of the cylinder 33b is indicated by an arrow S1 in FIG. 7. The forward stroke end of the cylinder 33b is determined to be the position where the front end of the push rod 36 finishes the turning of each nut 51 onto the nut centering pin 16 on the lower electrode 2. At this time, the annular projection 41 on the connector 35 is positioned in alignment with the sensor 44b which detects the forward stroke end of the cylinder 33b. When the sensor 44b detects the presence of the annular projection 41, the pneumatic air lines are operated to supply pneumatic pressure to the air port 49b and connect the air port 49a to a discharge port, not shown, to pneumatically actuate the cylinder 33a so that the piston rod 34, the connector 35 and the push rod 36 are again moved leftwardly, as viewed in FIG. 3. This further movement of the push rod 36 is to move the nut adjusting plate 37 into engagement with the nut 51 on the lower electrode 2 so that the nut 51 on the lower electrode 2 is rotated to a predetermined rotational position about the axis of the nut centering pin 16. More specifically, when the nut 51 is received on the nut centering pin 16, the front end face 37a of the plate 37 is spaced from the rear end of the nut 51 because the distance between the nut centering pin 16 and the front end face of the nut adjusting plate 37 is determined to be greater than ½ of the dimension between the two diametrically opposed flat faces of the nut but smaller than the diagonal dimension of the nut. However, when the push rod 36 is further moved leftwardly a distance S3 indicated in FIG. 7, the nut adjusting plate 37 is brought into contact with the rear end of the nut 51 to rotate the nut about the axis of the nut centering pin 16 to the predetermined rotational position .

Any further leftward movement of the push rod 36 is blocked by the engagement between the nut 51 on the pin 16 and the nut adjusting plate 37 secured to the push rod 36. Thus, when this position is reached, it is regarded that the feeding of the nut 51 onto the lower electrode 2 and the adjustment of the rotational position of the nut have been completed. After the lapse of a predetermined time period from the moment when this position is attained, therefore, the pneumatic air lines are disconnected from the pneumatic air source to discontinue the actuation of the cylinder 33a. It is to be noted that the length of the stroke of the cylinder 33a is determined to be substantially equal to the dimension of the nut 51 measured between the two diametrically opposed faces thereof.

In the event where no nut exists on the lower electrode 2 due to a failure either in the feeding of the nut from the chute 23 to the electrode 2 or in the turning of the nut from the front end of the push rod 36 onto the electrode 2, the push rod 36 will be advanced a distance S2 greater than the stroke S3 until the front end face 37a of the nut adjusting plate 37 is engaged by the nut centering pin 16. At this moment, the annular projection 41 on the connector 35 is positioned in alignment with the sensor 44a. Thus, the presence of the projection 41 is detected by the sensor 44a. On the basis of this detection, it is judged that there is no nut on the lower electrode 2 due to a failure.

In addition, if any foreign material, such as a nut, is pinched between the nut centering pin 16 and the nut adjusting plate 37, the push rod 36 cannot be advanced the distance S1. In this case, therefore, the sensors 45a and 45b do not detect the presence of the annular projection 41 on the connector 35. On the basis of this fact, therefore, it is judged that there is a failure in the feeding of a nut onto the lower electrode 2.

When it is confirmed that a nut 51 has been correctly fed onto the lower electrode 2, the pneumatic air lines are changed over so that the pneumatic pressure is now supplied into the air port 49a and the other air ports 49b and 49c are connected to air discharge ports, not shown. Thus, the piston rod 34 is retracted together with the push rod 36. The rearward end of the retracting stroke is detected by the sensor 45a, whereby the completion of the feeding of the nut 51 onto the lower electrode 2 can be confirmed.

The pneumatic pressure supplied into the air port 49b is at a level lower than the pneumatic pressure supplied into the air port 49c so as to prevent the nut centering pin 16 from being worn. For this purpose, a pressure reduction means (not shown) may be provided in the pneumatic pressure line extending to the air port 49b.

The supply of nuts from the parts feeder 9 to the feeder head 5 can conveniently be effected during a projection welding of a work. For this purpose, a nut feeding signal may be emitted simultaneously with the movement of the work to the lowered welding position b.

As will be clear from the foregoing description, the projection welder according to the present invention provides advantages as follows:

(a) The nut centering pin and the punch form reference points for determining the positions of the opposed upper and lower electrodes. When a nut has been fed onto the lower electrode, the nut centering pin is substantially snugly received in the threaded hole in the nut, so that the nut is precisely centered to the lower and upper electrodes and thus to the punch therein, whereby each work can be punched at a point which is aligned with the hole in the nut welded to the work. This, in turn, means that the outer periphery of the nut centered to the lower electrode can be utilized as a reference point to determine the center.

(b) The lower electrode can be designed to be of a minimum size and easily detachable for replacement with a substitution electrode to assure an economical design of the welder and a simplified maintenance thereof.

(c) The supply of air under pressure through the nut centering pin is effective to blow welding dusts away from works and nuts to be welded to reliably prevent the occurrence of any welding defects which would otherwise take place due to welding dust.

(d) The feeder head is independent of the welder frame. Thus, the orientation of the head and the angle of the orientation can be properly determined to accord with the configuration of works and with welding positions thereof. Thus, the feeder head provides a wide range of applications. In addition, since the feeder head is separated from the electrodes, the electrode structures can be simplified to facilitate easy manipulation of associated machines and devices disposed near to the electrodes.

(e) The projection welder is equipped with an automatic weld nut feeder which is simple in structure, operative to accurately position nuts relative to the electrodes usable for a variety of applications and thus economical.

What is claimed is:

1. A projection welder for welding together in succession by a no-hole welding method, each of a plurality of nuts, having a through-hole, and a respective work to form respective projections on a surface of the work, said welder, comprising a frame, an upper electrode mounted on said frame for movement relative to said frame in a substantially vertical direction, a stationary lower electrode mounted on said frame in substantially vertically aligned relationship to said upper electrode, a lower electrode tip removably mounted on said lower electrode and disposed in substantially vertically aligned relationship to said upper electrode, said lower electrode tip being formed therein with a substantially vertically extending through-hole substantially coaxial with said upper electrode, a generally tubular nut-centering pin detachably and substantially snugly disposed in and extending through the through-hole in said lower electrode tip, said nut-centering pin being formed therein with an axial through-hole and having an upper end portion extending upwardly beyond the upper surface of said lower electrode tip to receive thereon the nut to be welded to the work, means for automatically feeding each of said plurality of nuts successively onto said lower electrode with each said fed nut being received on said upper end portion of said nut centering pin, said upper electrode being spaced a distance upwardly from said upper end portion of said nut-centering pin for initial positioning of said work between said upper electrode and said nut-centering pin, said upper end portion of said nut-centering pin being dimensioned for substantially snugly engaging the through-hole in each nut for centering each nut relative to said upper and lower electrodes with an end face of each said respective nut engaging the upper face of said lower electrode tip and with the other end face of the nut directed towards the work thus positioned between said upper electrode and pin, said upper electrode being movable downwardly to bring the work into close contacting relationship to said other end face of the nut so that the work and the nut can be welded together, said upper end portion of said nut centering pin extending through the nut being welded substantially to a level of the work being welded, said lower electrode having an air passage with an inner end communicating with said axial through-hole in said nut-centering pin and an outer end adapted to be connected to an air source under pressure for directing air under pressure through said air passage and said axial through-hole and discharged from said upper end portion of said nut centering pin to the underside of the thus welded work to blow welding spatter away from the work and the nut.

2. A projection welder according to claim 1, wherein said not-centering pin is formed of an electrically insulating material.

3. A projection welder according to claim 1, further including a punch disposed in said upper electrode and substantially vertically movable relative to said upper electrode to and through the thus welded work, said nut having a die groove formed in said other end face thereof to cooperate with said punch to form a hole in the thus welded work.

4. A projection welder according to claim 1, wherein said nut feeding means includes a chute having a bottom end disposed at a level substantially the same as that of said lower electrode, means for supplying such nuts into said chute, and means reciprocally movable to push the nuts in succession from the bottom end of the chute onto said lower electrode.

5. A projection welder according to claim 4, wherein said chute is substantially tubular, said bottom end of said chute being closed, said chute being formed therein with a pair of openings adjacent to said closed bottom end and substantially aligned relative an axis of said nut-centering pin, said chute being operative to contain a plurality of nuts superposed in side-by-side relationship, said reciprocally movable means including a push rod having a forward end portion reciprocally movable through said aligned openings in said chute to push the nuts in said chute one after another until a lower part of each nut is engaged by said nut-centering pin, said forward end portion of said push rod being shaped to carry a nut to said nut-centering pin so that an end face of the nut being carried is directed to said nut-centering pin, said nut feeding means further including means for turning the nut thus engaged by said nut-centering pin about said lower part of the nut for receiving the nut on said nut-centering pin.

6. A projection welder according to claim 5, wherein said nut-feeding means further includes means for electromagnetically magnetizing at least said forward end portion of said push rod to electromagnetically hold a nut on said forward end portion of said push rod until the nut is engaged by said nut-centering pin.

7. A projection welder according to claim 6, wherein said nut-feeding means further includes means for reciprocally driving said push rod stepwise and means for controlling said driving means.

8. A projection welder according to claim 7, wherein said controlling means includes means for sensing positions of said push rod during the reciprocal movement thereof.

9. A projection welder according to claim 7, wherein said driving means comprises a pair of pneumatically actuated cylinders connected in series.

10. A projection welder according to claim 5, further including means for adjusting a position of each nut about the axis of said nut-centering pin, said nut adjusting means comprising a member mounted on said push rod and movable thereby into engagement with a periphery of the nut on said nut-centering pin to rotate the nut to a predetermined rotational position about the axis of said nut-centering pin.

11. A projection welder for welding a work and a nut together to form a projection on a surface of the work, said welder comprising a frame;
   an upper electrode mounted on said frame for movement relative to said frame in a substantially vertical direction;
   a stationary lower electrode mounted on said frame in substantially vertically aligned relationship to said upper electrode;
   a lower electrode tip removably mounted on said lower electrode and disposed in substantially vertically aligned relationship to said upper electrode, said lower electrode tip being formed therein with a substantially vertically extending through-hole substantially coaxial with said upper electrode;
   a generally tubular nut-centering pin detachably and substantially snugly disposed in and extending through the through-hole in said lower electrode tip, said nut-centering pin being formed therein with an axial through-hole having an upper end portion extending upwardly beyond the upper surface of said lower electrode tip to receive thereon the nut to be welded to the work;
   nut feeding means including a substantially tubular chute having a closed bottom end disposed at a level substantially the same as that of said lower electrode, said chute having a pair of openings adjacent said closed bottom end and substantially aligned relative an axis of said nut-centering pin, for containing a plurality of nuts superposed in side-by-side relationship, the nut feeding means including a push rod having a forward end portion shaped for carrying a nut to said nut-centering pin with an end face of the nut being carried directed to said nut-centering pin, and reciprocally movable through said openings in said chute to push the nuts in said chute one after another until a lower part of each nut is engaged by said nut-centering pin, means for turning the nut thus engaged by said nut-centering pin about said lower part of the nut so that the nut is received on said nut-centering pin, and means for supplying nuts into said chute;
   said upper electrode being spaced a distance upwardly from said upper end portion of said nut-centering pin before initially positioning the work between said upper electrode and said nut-centering pin;
   said upper end portion of the nut-centering pin being so dimensioned as to substantially snugly engage with a through-hole in the nut for centering the nut relative to said upper and lower electrodes with an end face of said nut engaged with the upper face of said lower electrode tip and with the other end face of the nut directed towards the work thus positioned,
   said upper electrode being movable downwardly to bring the work into close contacting relationship to said other end face of the nut so that the work and the nut can be welded together,
   said lower electrode being formed therein with an air passage having an inner end communicating with said axial through-hole in said nut-centering pin and an outer end for connection to an air source under pressure so that air under pressure can be fed through said air passage and said axial through-hole to blow welding spatter away from the work and the nut.

12. A projection welder according from claim 11, wherein said nut-feeding means further includes means for electromagnetically magnetizing at least said forward end portion of said push rod to electromagnetically hold a nut on said forward end portion of said push rod until the nut is engaged by said nut-centering pin.

13. A projection welder according to claim 12, wherein said nut-feeding means further includes means for reciprocally driving said push rod stepwise, and means for controlling said driving means.

14. A projection welder according to claim 13, wherein said controlling means includes means for sensing positions of said push rod during the reciprocal movement thereof.

15. A projection welder according to claim 14, wherein said driving means comprises a pair of pneumatically actuated cylinders connected in series.

16. A projection welder according to claim 15, wherein the nut turning means includes a member mounted on said push rod and movable thereby into engagement with the periphery of the nut on said nut-centering pin to rotate the nut to a predetermined rotational position about the axis of said nut-centering pin.

* * * * *